US008607233B2

(12) United States Patent
Ryman

(10) Patent No.: US 8,607,233 B2
(45) Date of Patent: Dec. 10, 2013

(54) WEB SERVICE MANAGEMENT

(75) Inventor: Arthur G. Ryman, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 13/090,690

(22) Filed: Apr. 20, 2011

(65) Prior Publication Data

US 2012/0272245 A1    Oct. 25, 2012

(51) Int. Cl.
G06F 9/46        (2006.01)
G06F 15/173      (2006.01)

(52) U.S. Cl.
USPC ........... 718/100; 718/102; 718/104; 709/223; 709/224; 709/226

(58) Field of Classification Search
None
See application file for complete search history.

(56) References Cited

U.S. PATENT DOCUMENTS

| 7,589,849 | B2* | 9/2009 | Carney et al. ............... 358/1.15 |
| 7,822,844 | B2  | 10/2010 | Oulu et al. |
| 2004/0215590 | A1* | 10/2004 | Kroening ........................... 707/1 |
| 2005/0010608 | A1* | 1/2005 | Horikawa ....................... 707/200 |
| 2006/0017975 | A1* | 1/2006 | Ly et al. ........................ 358/1.18 |
| 2006/0020942 | A1* | 1/2006 | Ly et al. .......................... 718/100 |
| 2006/0168355 | A1* | 7/2006 | Shenfield et al. ............... 709/250 |
| 2007/0260636 | A1* | 11/2007 | Baio et al. ................... 707/104.1 |
| 2009/0157879 | A1* | 6/2009 | Stoll .............................. 709/226 |
| 2009/0164621 | A1  | 6/2009 | Kothari et al. |
| 2009/0193132 | A1* | 7/2009 | Plewnia ......................... 709/230 |
| 2009/0300151 | A1* | 12/2009 | Friedman et al. ............. 709/222 |
| 2010/0094884 | A1* | 4/2010 | Baldwin et al. ............... 707/755 |
| 2011/0078297 | A1* | 3/2011 | Tamura ......................... 709/223 |
| 2011/0219353 | A1* | 9/2011 | Simpson et al. ............... 717/101 |
| 2012/0266156 | A1* | 10/2012 | Spivak et al. .................. 717/172 |

OTHER PUBLICATIONS

Impact of Load Balancing on SOAPy and RESTful Applications, [online]; [retrieved on Dec. 23, 2010]; retrieved from the Internet http://devcentral.f5.com/weblogs/macvittie/archive/2009/09/08/impact-of-load-balancing-on-SOAPy-and-RESTful-Applications.
Red Had Enterprise Linux 6, "Virtual Server Administration—Load Balancer Add-On for Red Hat Enterprise Linux", Red Hat, Inc. 2010.
REST Service with Load BAlancing discusses the use of load balancing for REST services, [online]; [retrieved on Dec. 23, 2010]; retrieved from the Internet http://stackoverflow. com/questions/1375883/rest-service-with-load-balancing.

(Continued)

Primary Examiner — Emerson Puente
Assistant Examiner — Charles Swift
(74) Attorney, Agent, or Firm — Cantor Colburn LLP

(57) ABSTRACT

A web service management process includes receiving, by a job server, a request for a web service, sending a request to register a job corresponding to the web service to an administrative service application, and creating, via the administrative service application, a job proxy resource for the job. The job proxy resource is configured to monitor execution of the job. A uniform resource identifier of the job proxy resource is sent to the job server. The process also includes sending, by the job server, information about job lifecycle events, progress, and a request for a current state of administrator actions on a job proxy of the job to the administrative service application. The administrative service application modifies the current state of the job proxy via commands received from an administrative client. The process further includes transmitting the current state of the job proxy to the job server.

15 Claims, 3 Drawing Sheets

(56) References Cited

OTHER PUBLICATIONS

"Cloud Computing: Benefits and Risks of Moving Federal IT into the Cloud", Testimony of Cita M. Furlani, Director, Information Technology Laboratory, National Institute of Standards and Technology, United States Department of Commerce, United States House of Representatives Committee on Oversight and Government Reform, Jul. 1, 2010.

* cited by examiner

WEB SERVICE MANAGEMENT

BACKGROUND

The present invention relates to application development, and more specifically, to a service for monitoring and controlling web services.

Some web services, such as document generation, are computationally intensive. In such cases, it is oftentimes necessary for humans to monitor execution of the services and abort service requests that are taking too long. Monitoring tasks are often implemented by an administrative application that runs on the same server as the web service. In order to service more requests, a pool of application servers may be configured and a load balancer may be used to dispatch requests to available servers. However, this can be problematic for human administrators since the number and Internet Protocol (IP) addresses of the servers are dynamic. For example, servers may be added dynamically in order to meet the demand for processing.

It is therefore infeasible to require a human to access an administrative application on each server. Although sophisticated systems management applications exist, a simple, low-cost, mechanism for administering web services in a load-balanced environment is desirable.

SUMMARY

According to one embodiment of the present invention, a method of implementing web service management includes receiving, by a job server, a request for a web service, sending a request to register a job corresponding to the web service to an administrative service application, and creating, via the administrative service application, a job proxy resource for the job. The job proxy resource is configured to monitor execution of the job. A uniform resource identifier of the job proxy resource is sent to the job server. The method also includes sending, by the job server, information about job lifecycle events, progress, and a request for a current state of administrator actions on a job proxy of the job to the administrative service application. The administrative service application modifies the current state of the job proxy via commands received from an administrative client. The process further includes transmitting the current state of the job proxy, via the administrative service application, to the job server.

According to another embodiment of the present invention, a system for providing web service management includes a job server, an administrative client system computer, and a monitor computer system executing an administrative service application. The monitor system computer is in communication with the job server and the administrative client system. The system implements a method. The method includes receiving, by the job server, a request for a web service, sending a request to register a job corresponding to the web service to the administrative service application, and creating, via the administrative service application, a job proxy resource for the job. The job proxy resource is configured to monitor execution of the job. The job proxy resource sends a uniform resource identifier of the job proxy resource to the job server. The method also includes sending, by the job server, information about job lifecycle events and progress and a request for a current state of administrator actions on a job proxy of the job to the administrative service application via the uniform resource identifier of the job proxy resource. The administrative service application modifies the current state of the job proxy via commands received from an administrative client. The method further includes transmitting the current state of the job proxy, via the administrative service application, to the job server.

According to a further embodiment of the present invention, a computer program product for providing web service management includes a computer storage medium embodied with computer-readable program code, which when executed by a computer causes the computer to implement a method. The method includes receiving, by a job server, a request for a web service, sending a request to register a job corresponding to the web service to an administrative service application, and creating, via the administrative service application, a job proxy resource for the job. The job proxy resource is configured to monitor execution of the job and send a uniform resource identifier of the job proxy resource to the job server. The method also includes sending, by the job server, information about job lifecycle events and progress and a request for a current state of administrator actions on a job proxy of the job to the administrative service application via the uniform resource identifier and the job proxy resource. The administrative service application modifies the current state of the job proxy via commands received from an administrative client. The method further includes transmitting the current state of the job proxy, via the administrative service application, to the job server.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The web service management provides an approach to monitoring and controlling web services in a load-balanced environment. In an exemplary embodiment, the web service management includes a monitor system that the web service and an administrator can use to record job lifecycle events and administrator actions. Typical lifecycle events may include, e.g., Job Started, Job Completed, % of Processing, Job Finished Normally, and Job Aborted in Response to Admin User Request. Typical admin user actions may include, e.g., requests to Abort the Job, Pause the Job, Resume a Paused Job, or Restart the Job. Additionally, the web service management includes web servers (also referred to herein as "job servers") that are configured with an address (e.g., uniform resource identifier (URI)) of the monitor. The web servers register their jobs with the monitor, and the monitor creates a job proxy resource for each of the jobs that is returned to the corresponding web servers to monitor the job execution. The services provided by the monitor are shared by each of the web servers via a web service interface. In an exemplary embodiment, the web service interface is a representational state transfer (REST) application programming interface (API). The exemplary web service management also includes an administrator user interface that enables a human administrator to track and take action on currently running jobs. The human administrator communicates with the monitor through the administrator user interface via an administrator client system, and the web servers communicate with the monitor through the REST API. A load balancer receives requests from a client and transmits the requests across the web servers in a distributed fashion.

Figure 1:
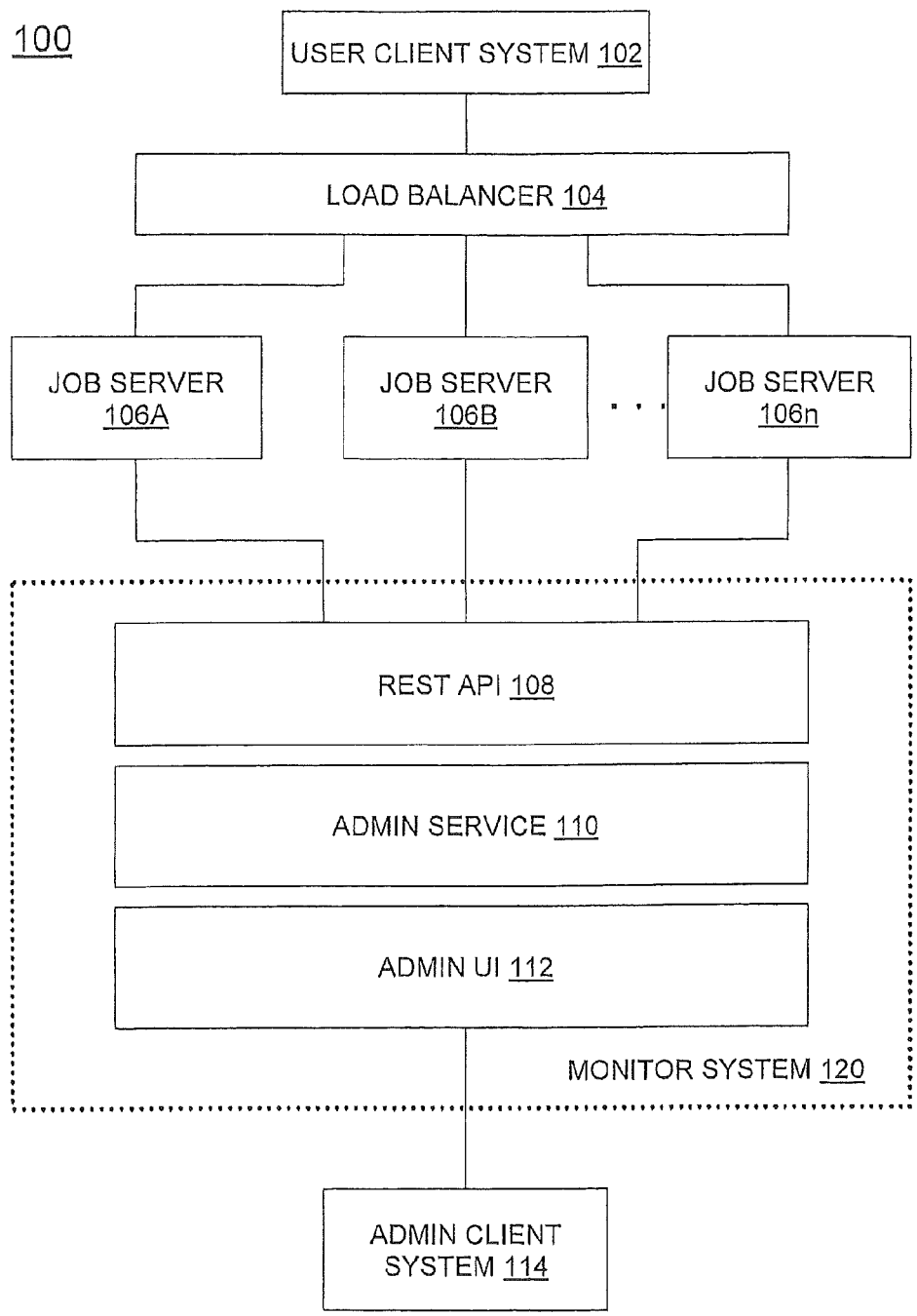
FIG. 1 depicts a diagram of a system upon which web service management may be implemented in an exemplary embodiment.

With reference now to FIG. 1, a system 100 upon which the web service management may be implemented will now be described. In an exemplary embodiment, the system 100 includes a user client system 102, a load balancer 104, job servers 106A-106n, a monitor system 120, and an administrative client system 114.

The user client system 102 requests web services (e.g., document generation) from a web server. The user client system 102 may be implemented as a general purpose computer processing device (e.g., a desktop, laptop, host-attached workstation, or mobile computing device). The user client system 102 may initiate the request for a web service via a web browser application executing on the user client system 102.

The load balancer 104 intercepts the requests for web services and transmits the requests to job servers 106A-106n in a distributed fashion (e.g., using known load balancing techniques or algorithms). The load balancer 104 may be implemented using hardware, software, or a combination thereof. The load balancer 104 may be implemented as a software tool executing on the same computer system as one or more of the job servers 106A-106n or may be entirely separate therefrom.

In an exemplary embodiment, the job servers 106A-106n are configured with an address (e.g., uniform resource identifier (URI)) of the monitor system 120 for registering new jobs received from the load balancer 104. In an exemplary embodiment, the job servers 106A-106n register their jobs via a web service interface, which is depicted in FIG. 1 as a representational state transfer (REST) API 108. The REST API 108 enables communications to occur between the job servers 106A-106n and the monitor system 120 using standard hypertext transfer protocol (HTTP) commands (e.g., GET, PUT, POST, etc.). In an exemplary embodiment, the job servers 106A-106n are implemented via hardware, software, or a combination thereof. Additionally, it will be understood that the job servers 106A-106n may be integrated within a single computer processing system (e.g., a mainframe computer), or may be disposed on independent and geographically disperse computer processing systems across a distributed networked environment. The job servers 106A-106n provide web services for client systems (e.g., client system 102). It will be understood that the load balancer 104 may dynamically add new job servers to the pool of available job servers in order to meet the demand for processing, or it may remove underutilized job servers from the pool as needed.

The administrative client system 114 monitors the performance of the web services provided by the job servers 106A-106n and initiates various actions based upon the current states of the jobs executing on the job servers 106A-106n. The administrative client system 114 also evaluates overall performance of the job servers 106A-106n over time, e.g., by logging and aggregating job server performance over time. The administrative client system 114 is operated by a human administrator (to differentiate it from the administrative service application executing via the monitor system 120, as will be described further herein. The administrative client system 114 may be implemented as a general purpose computer processing device (e.g., a desktop, laptop, host-attached workstation, or mobile computing device). The administrative client system 114 may initiate monitoring activities using the administrative user interface 112 implemented by the monitor system 120, as well as a web browser application executing on the administrative client system 114.

In an exemplary embodiment, the monitor system 120 provides services to both the job servers 106A-106n and the administrative client system 114 to facilitate the web service management. The monitor system 120 may be implemented in hardware, software, or a combination thereof. In an exemplary embodiment, the monitor system 120 is a high-speed computer processing device capable of handling the volume of activities conducted by the job servers 106A-106n and the administrative client system 114. In an exemplary embodiment, the monitor system executes an administrative service application 110. The administrative service application 110 bridges the communications occurring between the job servers 106A-106n and the administrative client system 114, as will be described further herein.

As indicated above, web service management provides a shared administrative service for monitoring and tracking web service performance via a web service API (REST API) 108. The exemplary web service management provides a tool for administrators to monitor and take action on various lifecycle events. The administrative client system 114 periodically requests job statuses of currently running jobs on the job servers 106A-106n via the administrative user interface 112. When the administrative client system 114 requests such updates, the administrative service application 110 receives these requests and returns a list of currently running jobs to the administrative client system 114. As indicated above, an operator (e.g., administrator) may take one or more actions on the jobs in the listing based upon factors, such as how long the job has been running. In one embodiment, the administrator may send a request to the administrative service application 110 via the administrative user interface 112 to abort a job. This request specifies that the status of a job proxy for the job will be changed from "normal" to "abort-requested." The administrative service application 110 tags the job proxy to accommodate this request. It will be understood that this tracking of actions taken by the administrator may occur during the job execution processes and monitoring thereof as will now be described in FIG. 2.

Figure 2:
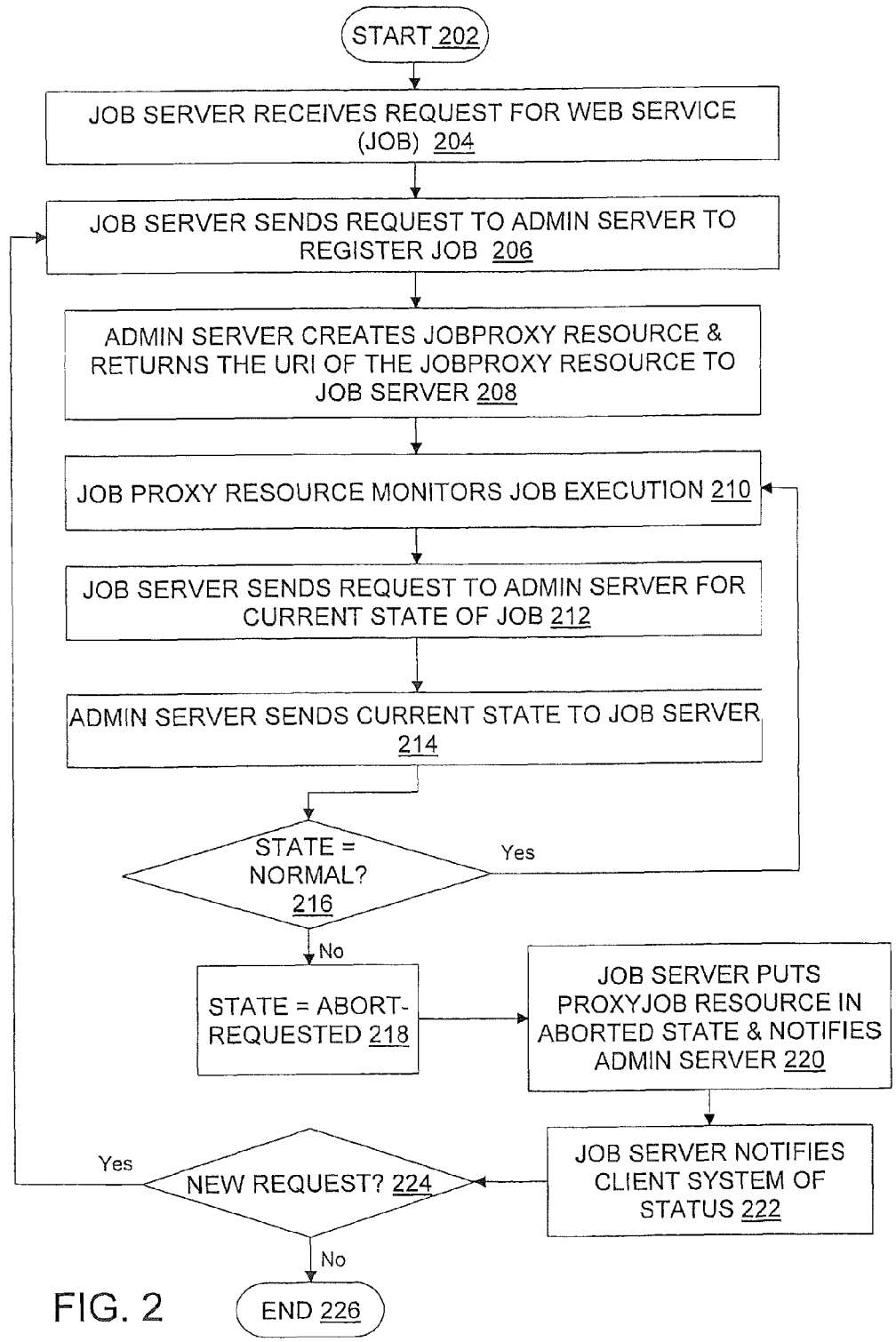
FIG. 2 is a flow diagram illustrating a process for implementing web service management in an exemplary embodiment.

Turning now to FIG. 2, a process for implementing web service management will now be described in an exemplary embodiment. The process described in FIG. 2 assumes that the client system 102 has requested a web service, which request has been intercepted by the load balancer 104 and transmitted to one of the job servers 106A-106n pursuant to an adopted load balancing technique. The process in FIG. 2 also assumes that the process begins at step 202 whereby a job server (e.g., one of job servers 106A-106n) receive a request for a web service from the load balancer 104 at step 204.

The job server sends a request to the monitor 120 via the administrative service application 110 (also referred to herein as "admin server") using the configured URI to register the job that corresponds to the web service requested at step 206.

At step 208, the admin server receives the request to register the job, creates a job proxy resource to monitor the job execution, and returns the Uniform Resource Identifier (URI)

of the job proxy resource to the requesting job server. A job proxy resource is an information resource that resides in the admin server (e.g., admin service 110) and is used to mediate the interactions between a job that is running in a job server and the admin user. Each job running in the job server reports its progress and status, i.e., its lifecycle events, to its corresponding job proxy resource, and checks it for admin user actions, such as a request to abort its execution. The admin user obtains information about the status of a job by requesting information from the job proxy resource. The admin user controls the job by sending actions, such as a request to abort the job, to its job proxy resource. At step 210, the job proxy resource monitors and logs data regarding the execution of the job (e.g., how long the job is taking to execute) from the job proxy resource.

The job servers 106A-106n are configured to periodically, or upon some threshold parameter, send requests for the current states of their corresponding job proxies. Thus, at step 212, the job server sends a request to the administrative server for the current state of the job proxy. As indicated above, the current state of the job proxy may change based upon actions taken by the administrator. At step 214, the admin server sends the current state of the job proxy to the job server.

At step 216, if the current state of the job proxy indicates "normal" state, this means the job is executing satisfactorily as determined by the administrator during the monitoring. In this scenario, the process returns to step 210, whereby the job proxy resource continues to monitor the execution of the job. Otherwise, if the state of the job proxy is not normal, then, for simplicity, the job proxy is determined to be in the state "abort-requested" at step 218. It will be understood that there may be other administrator actions in addition to requesting an abort. The abort administrator action is provided herein for illustrative purposes and is not to be construed as limiting in scope. In this scenario, the job server then aborts the running job and notifies the admin server of this "aborted" state at step 220. The admin server then updates the state of the job proxy resource to indicate that the job has been aborted. This action effectively closes out the monitoring of the job since no further control of its execution is possible. The admin user interface 112 will provide a suitable indication that the job has been aborted. The admin server may retain aborted job proxy resources for purposes of audit, or it may delete them after the expiration of some retention period. The job server also notifies the client system 102 of this "aborted" state at step 222.

At step 224, it is determined whether a new request has been received (e.g., a job server receives a request for a web service (step 204)). While a single job request process is described in FIG. 2 for purposes of illustration and ease of description, it will be understood that the job server may process multiple job requests concurrently. The process returns to step 206, whereby the job server sends a request to the admin server to register a job.

As indicated above, the load balancer 104 receives requests from client systems and transmits the requests in a distributed fashion to the job servers 106A-106n. While the process shown in FIG. 2 illustrates the web service management for a single job for ease of explanation, it will be understood that multiple job requests and monitoring thereof may be implemented simultaneously by the monitor, as well as the administrative client system 114. Thus, the currently running job listing is dynamically updated as needed to reflect the currently running jobs and their statuses in order to provide accurate up-to-date information to the administrator who is monitoring their progress.

Figure 3:
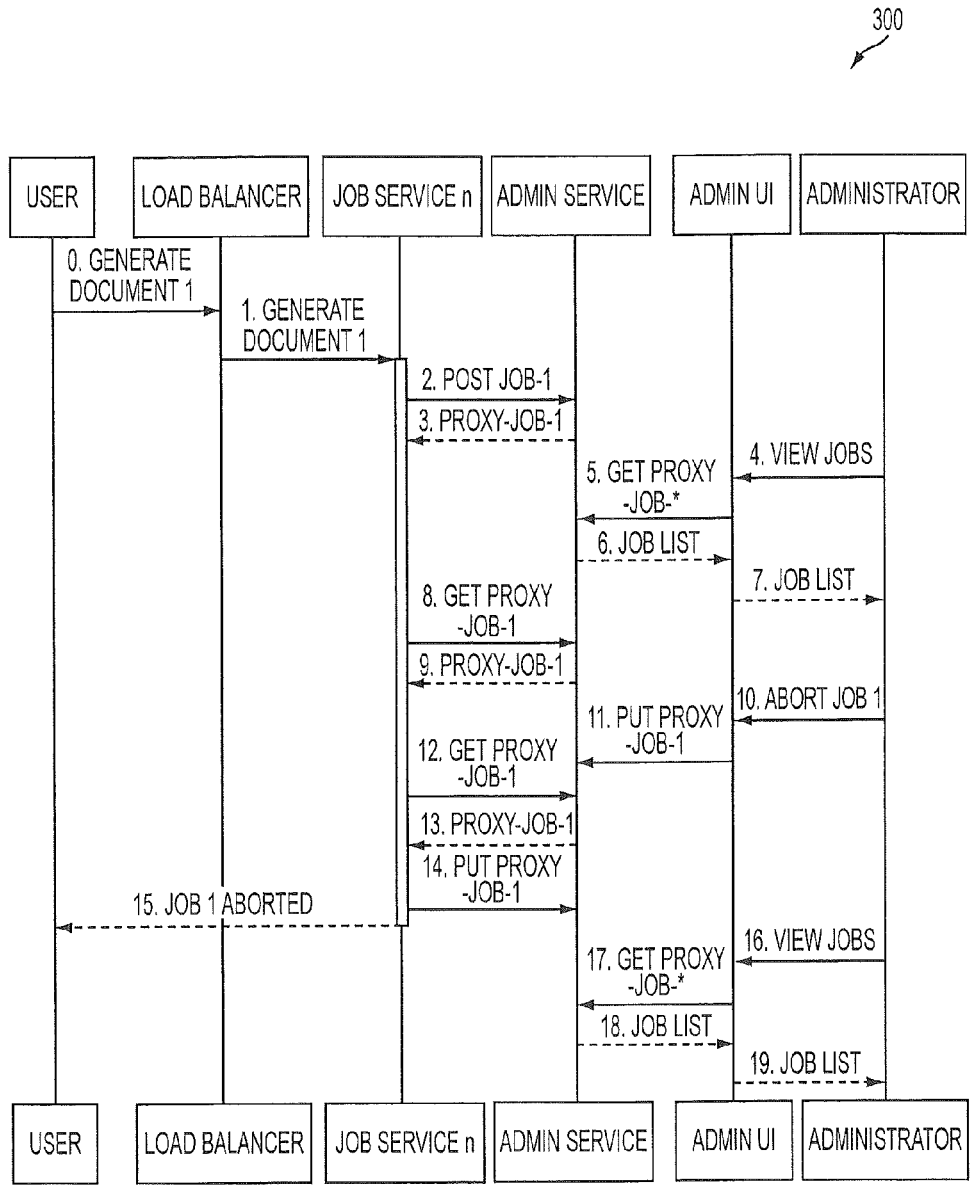
FIG. 3 is a sequence diagram illustrating a process of implementing web service management in an exemplary embodiment.

Turning now to FIG. 3, a sequence diagram illustrating the exemplary web service management will now be described.

The sequence diagram 300 provides detailed and concurrent interactions among the job servers 106A-106n, the admin service 110, and the admin client system 114. As shown in FIG. 3, a user at the user client system 102 requests, e.g., that a document be generated. The request is sent to the load balancer 104, which selects a job server from the pool of jobs servers 106A-106n using its standard algorithm. In this example, it selects job server 106n.

Job server 106n activates a thread to generate the document. If this task takes longer than a predefined threshold, e.g., 30 seconds, the job server 106n POSTs a request to the admin service 110 to register the job. The admin service 110 creates a new job proxy resource, e.g., proxy-job-1, and returns it to the job server 106n.

A human administrator opens a web browser at the admin client system 114 and views the admin user interface 112 to monitor the running jobs. The user interface 112 sends a GET request to the admin service 110 to get the list of all jobs. The admin service 110 returns the list of all jobs to the user interface 112, and the user interface 112 renders the job list for the administrator at the admin client system 114.

After another predefined period of time, e.g., 30 seconds, the job server 106n GETs the current state of the job proxy resource, i.e., proxy-job-1. The admin service 110 returns proxy-job-1 to the job server 106n. The proxy-job-1 is still in the normal state.

The human administrator now decides that the job is taking too long and requests that the job be aborted. The admin user interface 112 sends a PUT request with the proxy-job-1 resource state modified to abort-requested.

After another predefined period of time, the job server 106n GETs the current state of the proxy-job-1. The admin service 110 now returns the proxy-job-1 in the abort-requested state to the job server 106n.

The job server 106n aborts job 1 and PUTs the proxy-job-1 resource in the aborted state back to the admin service 110. The job server 106n returns an aborted status message to the user client system 102. The human administrator views the jobs again, e.g., the user interface 112 refreshes. The user interface 112 GETs the list of jobs from the admin service 110. The admin service 110 returns the list of jobs to the admin user interface 112. The admin user interface 112 renders the list of jobs to the admin client system 114, and the human administrator sees that job 1 has been aborted.

Technical effects of the present invention provide for monitoring and controlling web services in a load-balanced environment. A monitor system enables a web service and an administrator to record job lifecycle events and administrator actions. The web servers register their jobs with the monitor via an address of the monitor that is configured therein. The monitor creates a job proxy resource for each of the jobs that is returned to the corresponding web servers to monitor the job execution. The services provided by the monitor are shared by each of the web servers via a web service interface. An administrator user interface is configured to enable a human administrator to track and take action on currently running jobs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for providing web service management, comprising:
   receiving, by one of a plurality of job servers, a request for a web service from a load balancer, each of the plurality of job servers configured to execute requests for the web service;
   sending a request to register a job corresponding to the web service to an administrative service application of a monitor system, which is configured to communicate with each of the plurality of job servers;
   creating, via the administrative service application, a job proxy resource for the job, the job proxy resource configured to monitor execution of the job, and sending a uniform resource identifier of the job proxy resource to the one of the plurality of job servers;
   configuring a uniform resource identifier of the administrative service application on the one of the plurality of job servers, the one of the plurality of job servers sending the request to the administrative service application to register the job via the uniform resource locator;
   sending, by the one of the plurality of job servers, information about job lifecycle events and progress and a request for a current state of administrator actions on a job proxy of the job to the administrative service application via the uniform resource identifier of the job proxy resource, the administrative service application modifying the current state of the job proxy via commands received from an administrative client; and transmitting the current state of the job, via the administrative service application, to the one of the plurality of job servers, wherein each of the plurality of job servers are configured to communicate with the administrative service application via an application programming interface;
   wherein each of the plurality of job servers are configured to periodically request the current state of the job proxy resource from the administrative service application; and
   wherein upon determining the current state of the job proxy resource is not normal, placing the proxy job resource in an aborted state and notifying the administrative service application of the aborted state, the administrative service application providing the administrative client with access to the current state.

2. The method of claim 1, further comprising:
   receiving, by the administrative service application, a request from the administrative client for currently running jobs executing on the plurality of job servers that include the one of the plurality of job servers subject to the request for a web service;
   returning a list of the currently running jobs to the administrative client; and
   receiving, at the administrative service application, a request from the administrative client to modify a state of at least one of the currently running jobs.

3. The method of claim 2, further comprising:
   responsive to receiving the request to modify a state of at least one currently running job proxies of the currently running jobs, the method includes:
   modifying a state of the job proxy resource of the job to 'abort-requested;' and
   upon receiving a request from the one of the plurality of job servers for the current state of the job:
   transmitting, via the administrative service application, the state of the job proxy resource of the job to the one of the plurality of job servers;
   modifying the state of the job proxy to 'aborted' by the one of the plurality of job servers; and
   notifying a client system that initially requested the web service of the aborted state of the job.

4. The method of claim 3, wherein the request from the administrative client to modify a state of at least one of the currently running jobs is transmitted to the administrative service application via an administrative user interface.

5. The method of claim 1, wherein the application programming interface is a representational state transfer service.

6. A system for providing web service management, comprising:
   a load balancer;
   a plurality of job servers configured to execute requests for a web service;
   an administrative client system computer; and
   a monitor computer system executing an administrative service application in communication with each of the plurality of job servers and the administrative client system, the system implementing a method, comprising:
   receiving, by the load balancer, a request for the web service and forwarding the request for the web service to one of the plurality of the job servers;
   sending a request to register a job corresponding to the web service to the administrative service application;
   creating, via the administrative service application, a job proxy resource for the job, the job proxy resource configured to monitor execution of the job, and sending a uniform resource identifier of the job proxy resource to the one of the plurality of job servers;
   configuring a uniform resource identifier of the administrative service application on the one of the plurality of job servers, the one of the plurality of job servers sending the request to the administrative service application to register the job via the uniform resource locator;
   sending, by the one of the plurality of job servers, information about job lifecycle events and progress and a request for a current state of administrator actions on a job proxy of the job to the administrative service application via the uniform resource identifier and the job proxy resource, the administrative service application modifying the current state of the job proxy via commands received from an administrative client; and
   transmitting the current state of the job proxy, via the administrative service application, to the job servers, wherein each of the plurality of job servers are configured to communicate with the administrative service application via an application programming interface;
   wherein each of the plurality of job servers are configured to periodically request the current state of the job proxy resource from the administrative service application; and wherein upon determining the current state of the job proxy resource is not normal, placing the proxy job resource in an aborted state and notifying the administrative service application of the aborted state, the administrative service application providing the administrative client with access to the current state.

7. The system of claim 6, wherein the method further comprises:
receiving, by the administrative service application, a request from the administrative client for currently running jobs executing on the plurality of job servers that include the one of the plurality of job servers subject to the request for a web service;
returning a list of the currently running jobs to the administrative client; and
receiving, at the administrative service application, a request from the administrative client to modify a state of at least one currently running job proxy of the currently running jobs.

8. The system of claim 7, wherein the method further comprises:
responsive to receiving the request to modify a state of at least one of the currently running job proxies, the method includes:
modifying a state of the job proxy resource of the job to 'abort-requested;' and
upon receiving a request from the one of the plurality of job servers for the current state of the job proxy:
transmitting, via the administrative service application, the state of the job proxy resource of the job to the one of the plurality of job servers;
modifying the state of the job proxy to 'aborted' by the one of the plurality of job servers; and
notifying a client system that initially requested the web service of the aborted state of the job.

9. The system of claim 8, wherein the request from the administrative client to modify a state of at least one of the currently running jobs is transmitted to the administrative service application via an administrative user interface.

10. The system of claim 6, wherein the application programming interface is a representational state transfer service.

11. A computer program product for providing web service management, the computer program product comprising a non-transitory computer storage medium embodied with computer-readable program code, which when executed by a computer causes the computer to implement a method, the method comprising:
receiving, by the load balancer, a request for the web service and forwarding the request for the web service to one of the plurality of the job servers;
sending a request to register a job corresponding to the web service to the administrative service application;
creating, via the administrative service application, a job proxy resource for the job, the job proxy resource configured to monitor execution of the job, and sending a uniform resource identifier of the job proxy resource to the one of the plurality of job servers;
configuring a uniform resource identifier of the administrative service application on the one of the plurality of job servers, the one of the plurality of job servers sending the request to the administrative service application to register the job via the uniform resource locator;
sending, by the one of the plurality of job servers, information about job lifecycle events and progress and a request for a current state of administrator actions on a job proxy of the job to the administrative service application via the uniform resource identifier and the job proxy resource, the administrative service application modifying the current state of the job proxy via commands received from an administrative client; and
transmitting the current state of the job proxy, via the administrative service application, to the job servers, wherein each of the plurality of job servers are configured to communicate with the administrative service application via an application programming interface;
wherein each of the plurality of job servers are configured to periodically request the current state of the job proxy resource from the administrative service application; and
wherein upon determining the current state of the job proxy resource is not normal, placing the proxy job resource in an aborted state and notifying the administrative service application of the aborted state, the administrative service application providing the administrative client with access to the current state.

12. The computer program product of claim 11, wherein the method further includes:
receiving, by the administrative service application, a request from the administrative client for currently running jobs executing on the plurality of job servers that include the one of the plurality of job servers subject to the request for a web service;
returning a list of the currently running jobs to the administrative client; and
receiving, at the administrative service application, a request from the administrative client to modify a state of at least one currently running job proxy of the currently running jobs.

13. The computer program product of claim 12, wherein the method further includes:
responsive to receiving the request to modify a state of at least one of the currently running job proxies, the method includes:
modifying a state of the job proxy resource of the job to 'abort-requested;' and
upon receiving a request from the one of the plurality of job servers for the current state of the job:
transmitting, via the administrative service application, the state of the job proxy resource of the job to the one of the plurality of job servers;
modifying the state of the job proxy to 'aborted' by the one of the plurality of job servers; and
notifying a client system that initially requested the web service of the aborted state of the job.

14. The computer program product of claim 13, wherein the request from the administrative client to modify a state of at least one of the currently running job proxies is transmitted to the administrative service application via a administrative user interface.

15. The computer program product of claim 11, wherein the application programming interface is a representational state transfer service.

* * * * *